United States Patent Office 3,415,267
Patented Dec. 10, 1968

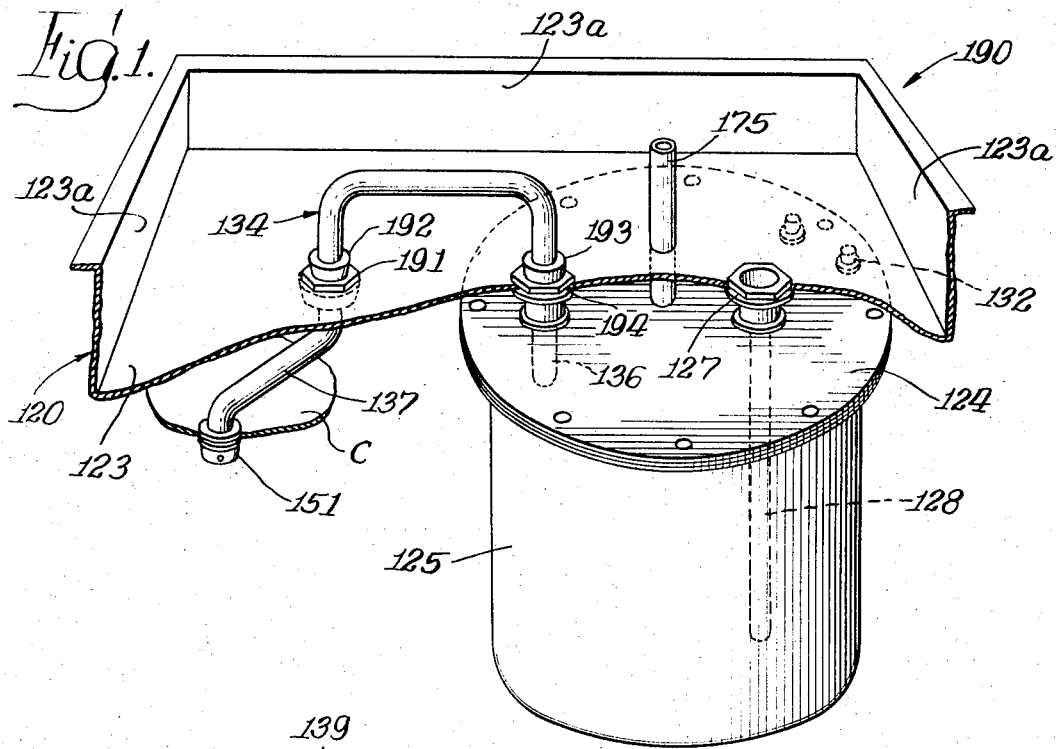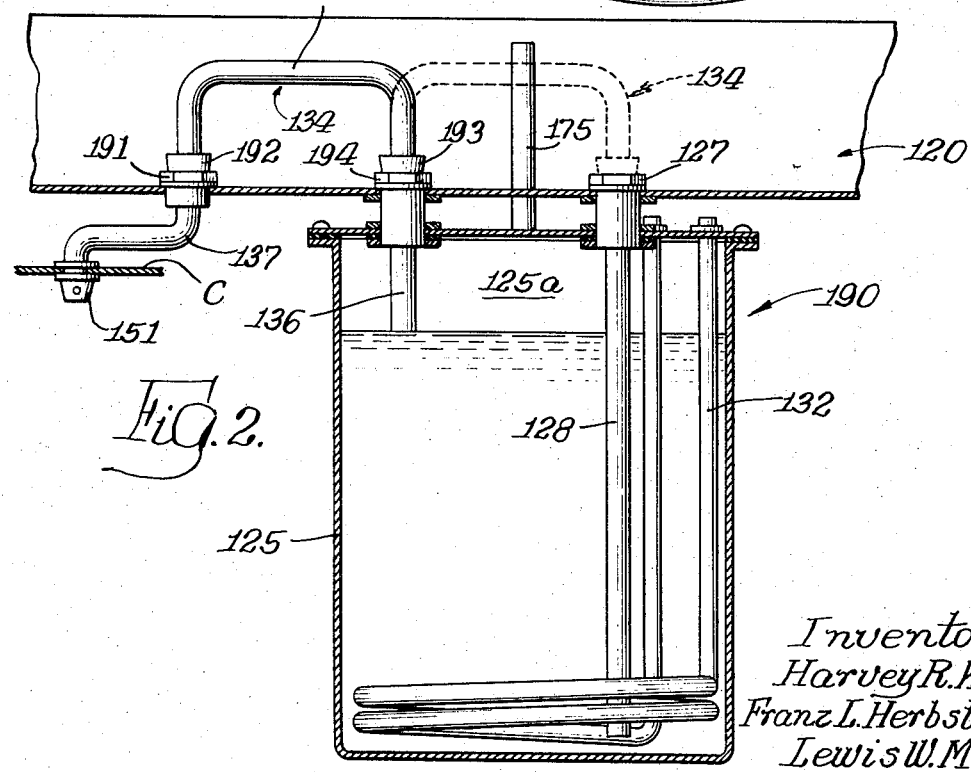

3,415,267
LIQUID SUPPLY APPARATUS
Harvey R. Karlen, Chicago, Franz L. Herbsthofer, Evanston, and Lewis W. Martin, Chicago, Ill., assignors to Cory Corporation, a corporation of Delaware
Filed Aug. 31, 1966, Ser. No. 576,477
7 Claims. (Cl. 137—132)

This invention relates to brewing apparatus and in particular to apparatus for providing liquid to a brewing means to brew a beverage such as coffee.

In one conventional method of brewing coffee and the like, the beverage charge is provided in a suitable cartridge through which hot water is passed. In conventional automatic apparatus utilizing this method of brewing, means are provided for heating a tank of water to brewing temperature permitting a selected quantity of the hot water to be withdrawn from the tank when desired to pass through the cartridge and thereby brew the coffee.

For home use, it is desirable to simplify the construction of the apparatus thereby to reduce the cost thereof while yet permitting the user to obtain an accurate preselected quantity of coffee. In one known home type brewer the cartridge is merely disposed over a suitable container and the user merely pours a preselected quantity of hot water therethrough, as from a teakettle or the like. This pour-through concept is highly desirable as it permits the user to accurately gauge the quantity of brewed coffee as this quantity is closely equal to the quantity of hot water poured through the cartridge, the quantity being decreased only by the small amount of hot water necessary to wet the grounds and retained in the cartridge upon completion of the brewing operation.

In copending Karlen et al. application Ser. No. 499,306, filed Oct. 21, 1965, and owned by the assignee hereof, an improved brewing appartus of the pour-through type which effectively eliminates the undesirable requirement of heating the desired quantity of water by means separate from the brewing apparatus, while yet providing all of the desirable features and advantages of the known pour-through brewers, was disclosed and claimed. The present invention comprehends an improved form of such a brewing apparatus providing for selective delivery of the input water to the tank or directly to the brewing cartridge as desired.

Thus, one object of the invention is the provision of a pour-through brewing apparatus having new and improved means for permitting the user to pour thereinto a preselected quantity of either cold water or hot water and substantially immediately cause a delivery of hot water for brewing or the like.

Another object of the invention is the provision of such an apparatus having new and improved means for selectively conducting water delivered thereto to a hot water tank where the delivered water is cold water, or to an outlet where the delivered water is hot water.

Yet another object of the invention is the provision of such an apparatus wherein the means for selecting the delivery of water to the outlet is arranged to provide automatically an expansion space in the hot water tank upon completion of a hot water delivery operation wherein cold water is delivered into the tank.

Other features and advantages of the invention will be apparent from the following description taken in connection with the accompanying drawings wherein:

FIGURE 1 is a fragmentary perspective view of a portion of a brewing apparatus having a hot water supply means embodying the invention; and FIGURE 2 is a vertical section thereof.

In the exemplary embodiment of the invention as disclosed in the drawing, a brewing liquid supply means generally designated 190 is shown to comprise a closed hot water tank 125 having a suitable electrical heater 132 extending downwardly through a top 124 of the tank for heating water delivered thereinto. The heater may have suitable terminals 132a exposed above the tank top 124 for electrical connection thereto of suitable power supply leads (not shown). An upwardly opening delivery tray 120 having a bottom 123 and upstanding side walls 123a is disposed above the tank. As indicated briefly above, the brewing liquid supply means 190 is arranged to cause, by the selective delivery of either cold water or hot water to the tray 120 a resultant delivery of only hot water to a delivery structure herein comprising a short conduit 137 and output spray head fitting 151 extending through the wall of a brewing cartridge C.

More specifically, the delivery tube 128 of tank 125 is provided with an inlet fitting 127 opening through the tank top 124 and superjacent the bottom 123 of tray 120. The spray head fitting 151 is connected through the conduit 137 to a fitting 191 opening through the tray bottom 123. A U-shaped siphon tube 134 is provided at one downturned end with a fitting 192 and at the opposite end with a fitting 193. Fitting 193 is sealingly movably connected to a fitting 194 opening through the tray bottom 123 and tank top 124. As shown in FIGURE 2, the lower end 136 of the siphon tube 134 extends downwardly into the tank 125 for conducting hot water therefrom.

In the full line position of FIGURE 2, the siphon tube 134 conducts hot water from the tank 125 to the outlet fitting 151 when cold water is delivered into the tray 120. In the arrangement of the apparatus, the hot water flows outwardly from the tank when the level of water in the tube 134 reaches the level of the upper portion 139. Once the hot water commences flow through the siphon tube 134, flow is continued therefrom until the level in the tank drops below the lower end of the inlet to the siphon tube, thereby automatically providing an expansion space 125a in the top of the tank to accommodate the increased volume of the water resulting from the heating thereof in the tank.

Apparatus 190 is further arranged to permit the user to bypass the hot water tank 125 and deliver hot water directly through the tray 120 to the spray head fitting 151, such as where a suitable different hot water supply means is available. When such operation of the apparatus 190 is desired, the siphon tube 134 is arranged in the dotted line position of FIGURE 2 to have the fitting 192 connected to the fitting 127 of the hot water delivery tube 128. In this arrangement, fitting 191 is open to the tray 120 to receive the hot water and conduct it directly to the spray head fitting 151. In this arrangement of the apparatus, the electrical heater 132 is disconnected. A vent 175 is provided opening through the tank top 124. Thus, should the heater 132 inadvertently be energized vapor may be vented outwardly from the tank notwithstanding the interconnected arrangement of the inlet and outlet fittings.

In the illustrated embodiment, the fittings 192 and 193 comprise conventional resilient cork-type plug fittings. Thus, in the liquid supply means 190, the total quantity of hot water delivered to the cartridge C is a function solely of the quantity of either cold or hot water delivered to the tray 120. The siphon 134 assures that the level of water in tank 125 is restored to the same point every time cold water is delivered to the tank to cause flow of hot water therefrom to the cartridge C. When the swingable siphon is disposed to permit hot water to be delivered directly to the conduit 137, bypassing the tank 125, the siphon serves as means for effectively closing the top of the tank. The siphon tube 134 provides synergistically the functions of automatic level control, selective water delivery control, and tank closure control in an extremely simple and economical manner.

While we have shown and described one embodiment

We claim:
1. Liquid supply apparatus comprising:
    means defining a heating chamber for holding water to be heated therein;
    means defining an inlet receptacle superjacent said chamber means;
    means defining a first passage communicating between an upper portion of said heating chamber and the bottom portion of said receptacle;
    means defining a second passage communicating between the bottom portion of said receptacle and said heating chamber for conducting water from said receptacle to said heating chamber;
    means for heating water in said heating chamber;
    means defining a hot water delivery structure;
    means defining a third passage communicating between said bottom portion of the receptacle and said delivery structure; and
    means for selectively
    (a) providing a connecting passage between said first passage and said third passage, with said second passage being open, to conduct hot water from the heating chamber to said delivery structure as the result of water flow from said receptacle through said second passage into said heating chamber, or
    (b) preventing water flow from said receptacle to said heating chamber through said first and second passages and concurrently permitting water flow from said receptacle through said third passage to said delivery structure.

2. The liqiud supply apparatus of claim 1 wherein said last-named means comprises a conduit.

3. The liquid supply apparatus of claim 1 wherein said last-named means comprises a siphon.

4. The liquid supply apparatus of claim 1 wherein said last-named means defines a siphon and said first passage means comprises a downward extension of said siphon in said heating chamber to substantially below the upper end of the heating chamber for forming an expansion space in the top of the heating chamber upon termination of siphon flow of water frmo the chamber through said siphon means.

5. The liquid supply apparatus of claim 1 wherein said last-named comprises means for selectively connecting said first and second passages for effectively closing the same.

6. The liquid supply apparatus of claim 1 wherein said last-named means comprises a conduit having means at the one end thereof for sealed connection to said first passage means and means at the opposite end thereof for sealed connection selectively to the delivery structure or the second passage means.

7. The liquid supply apparatus of claim 1 wherein said last-named means comprises a U-shaped conduit having a bight portion and leg portions preselected to dispose the bight portion in the receptacle below the upper level of the receptacle.

References Cited

UNITED STATES PATENTS 3,220,334   11/1965   Martin _____ 99—282

M. CARY NELSON, *Primary Examiner.*

MICHAEL O. STURM, *Assistant Examiner.*

U.S. Cl. X.R.

137—271